United States Patent [19]
Johnson et al.

[11] Patent Number: 5,001,703
[45] Date of Patent: Mar. 19, 1991

[54] SPECTRALLY EFFICIENT TDM DUPLEX COMMUNICATION SYSTEM

[75] Inventors: Brian K. A. Johnson; Stelios J. Patsiokas, both of Plantation, Fla.

[73] Assignee: Motorola, Inc.

[21] Appl. No.: 300,993

[22] Filed: Jan. 23, 1989

[51] Int. Cl.⁵ ............................ H04J 3/16; H04J 3/14
[52] U.S. Cl. ................................... 370/79; 370/84; 370/95.1; 370/29
[58] Field of Search ............... 370/79, 24, 26, 29, 370/32, 95, 84

[56] References Cited
U.S. PATENT DOCUMENTS

| | | | |
|---|---|---|---|
| 4,335,455 | 6/1982 | Hirschmann | 370/32 |
| 4,597,073 | 6/1986 | Staples | 370/24 |
| 4,686,672 | 8/1987 | Namiki | 370/95 |
| 4,754,450 | 6/1988 | Lynk, Jr. et al. | 370/29 |
| 4,841,521 | 6/1989 | Amada et al. | 370/29 |

Primary Examiner—Douglas W. Olms
Assistant Examiner—Min Jung

[57] ABSTRACT

An improved duplex time division multiplexed (TDM) communication system is provided while conserving spectrum and efficiency. To accommodate two voice signals on one channel, the time allocated in a channel for brief listener voice acknowledgements is short; the time allocated for taker transmission is long. Moreover, the coding rate for the listener is slower than for the taker. The slot allocation can be switched whereby whoever is the dominant taker will maintain the longer slot.

20 Claims, 3 Drawing Sheets

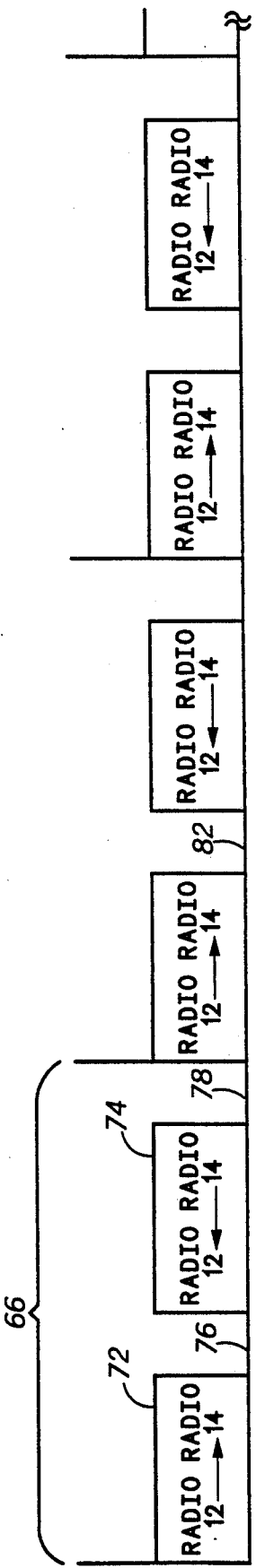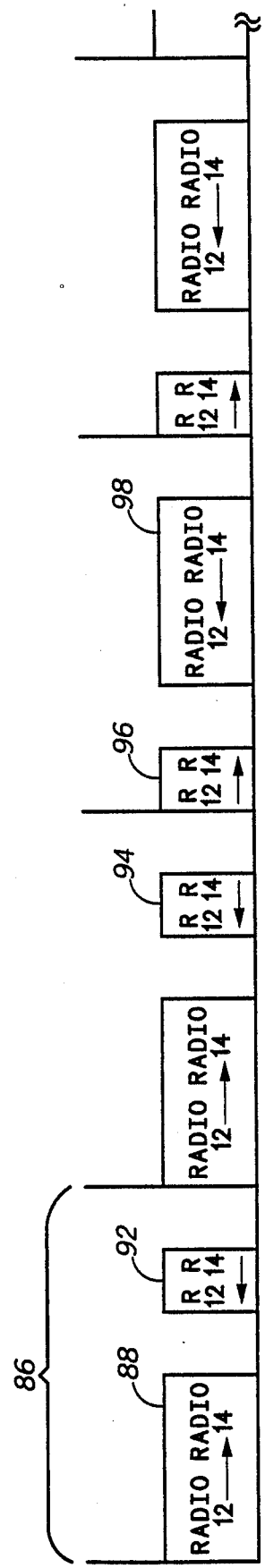

SPECTRALLY EFFICIENT TDM DUPLEX COMMUNICATION SYSTEM

BACKGROUND OF THE INVENTION

As used herein, a physical channel is the frequency used in a system. Whereas, logical channels are subdivided from the physical channel. The main attraction for any full-duplex two-way radio system is the ability for the listener to interrupt and speak at any time. Conventional two-way radio systems operating in the duplex mode require two different frequencies for communication to take place in both directions simultaneously; this wastes spectrum. Others have simulated duplex operation on a single physical or logical channel by utilizing hardware control of the transmitter and receiver and sampling the physical or logical channel for the presence of a carrier wave. This approach, however, generally requires increased radio complexity.

Additional problems arise, however, when sufficient bandwidth is not available. For example, the current state of the art in land mobile communications provides for a maximum channel bit rate of approximately 16 kb/s on 25 kHz spaced radio frequency physical channels. If 10% of the channel bit rate is allotted for synchronization and control, 14.4 kb/s is left to be equally divided between two transmitters. However, 7.2 kb/s is not sufficient assuming that 10.8 kb/s is necessary for a good quality voice signal. Therefore, a need exists for a method to provide efficient duplex operation on narrowband land-mobile communication physical or logical channels, while maintaining voice quality.

Given sufficient bandwidth in the physical or logical channel, time division multiplexing (TDM) of voice and data onto a single physical or logical channel is known to provide full-duplex radio operation. Generally, the physical or logical channel is divided into frames having at least two time slots for a radio to transmit half the time, and to receive at half the time. While effective, this practice wastes spectrum since, in ordinary conversations, the talker usually receives only brief feedback responses (or acknowledgements) during his or her transmissions.

Even if sufficient bandwidth is available on a wide-band physical channel, using less bandwidth while maintaining voice quality allows partitioning the physical channel into more logical channels to efficiently accommodate more users.

SUMMARY OF THE INVENTION

Accordingly, it is an object of the present invention to provide an improved full-duplex time division multiplexed communication system.

Briefly, according to the invention, the speaking party (talker) of a conversation enjoys a high coding rate and slot duration to provide a quality speech signal. The listening (or acknowledging) party (listener) is allocated a smaller slot and a lower coding rate for his or her brief acknowledgements. However, when the listener interrupts and begins to speak for longer than a brief acknowledgement, the slot allocations are reversed so that the talking party always provides a high quality speech. In this way, full-duplex is provided while conserving spectrum and efficiency.

BRIEF DESCRIPTION OF THE DRAWINGS

FIG. 5a is a timing diagram illustrating operation of the system of FIG. 1 with equal bit rates in both directions used for a TDMA application in accordance with the invention.

FIG. 5b is a timing diagram illustrating the operation of the system of FIG. 1 with unequal bit rates used in accordance with the invention.

DESCRIPTION OF THE PREFERRED EMBODIMENT

Figure 1:
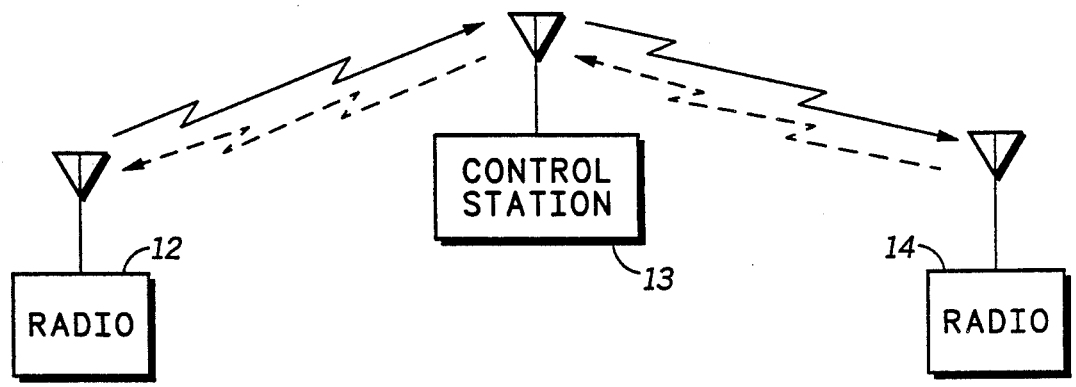
FIG. 1 is a block diagram of a TDM communication system in accordance with the present invention.

Referring now to FIG. 1, a TDM communication system in accordance with the present invention is illustrated. Basically, a two-way radio (or station) 12 communicates (optionally, if the radios are out of range, via a control station 13) with a second radio (or station) 14 using radio frequency (RF) physical or logical channels that are divided into frames having at least two time slots: a forward slot and a return slot. The radio 14 may be identical to the radio 12 and the control station 13 may be a repeater or a fixed station, each comprising a network controller to command system operation.

To more clearly illustrate the efficient utilization of the frequency spectrum, a wide-band example will be used for emphasis. Assume first a conventional TDM-TDMA (time division multiple access) wide-band physical channel having a channel capacity of 160 kb/s. If speech is encoded at 10.8 kb/s each for the talker and the listener for quality speech in both directions, a duplex logical channel would require 21.6 kb/s for the channel bit rate (or data transmission rate). If 10% of the 160 kb/s channel rate is used for synchronization and control, 144 kb/s remain for the voice logical channels. Dividing the remaining 144 kb/s by the 21.6 kb/s channel bit rate, yields 6 full-duplex logical channels which may not all be used during off-peak operation.

However, during peak hours, the present invention allocates 10.8 kb/s only the talking party and 3.6 kb/s, a third less, for example, to the listener. As a result, a duplex logical channel requires 14.4 kb/s for the channel bit rate and 4 more logical channels result (Dividing the channel rate of 144 kb/s by the channel bit rate of 14.4 kb/s yields 10 logical channels).

With more logical channels available, the original TDMA physical channel may efficiently accommodates more users. In a TDMA application, the present invention envisions a selection from encoding conventionally to encoding speech at unequal bit rates to transmit in a smaller bandwidth when a predetermined number of logical channels are already in used. Of course, the present invention may also be implemented on a TDM-FDMA (frequency division multiple access) physical or logical channel. However, the benefit in this case will be simpler voice coding or better speech quality rather than spectrum efficiency improvement since the Federal Communication Commission (FCC) specifies the number of physical channels available and pre-assigns the bandwidth allocation on a FDMA physical channel. To use the increased FDMA logical channels made available under the present invention, approval from the FCC is required.

The present invention contemplates the use of the current standard for land-mobile communication physical or logical channels, but provides efficient duplex operation by varying the slot allocations among users by varying the coding rates between the talker and listener. To accommodate two voice signals within a frame for spectrally efficient duplex operation, the present invention contemplates vocoding the brief feedback voice signal at a slower coding rate using, for example, linear predictive coding (LPC), to hold the speech data rate to approximately 3.6 kb/s in the return slot. For the talker, the invention contemplates vocoding the voice at a higher coding rate of approximately 10.8 kb/s to obtain a channel bit rate less than 16 kb/s (assuming a 10% overhead). With less bandwidth used, two voice signals may be transmitted on the same physical or logical channel, while maintaining voice quality for the dominant speaker. Other coding rate differentials may also be used with LPC or another coding scheme.

Figure 2:
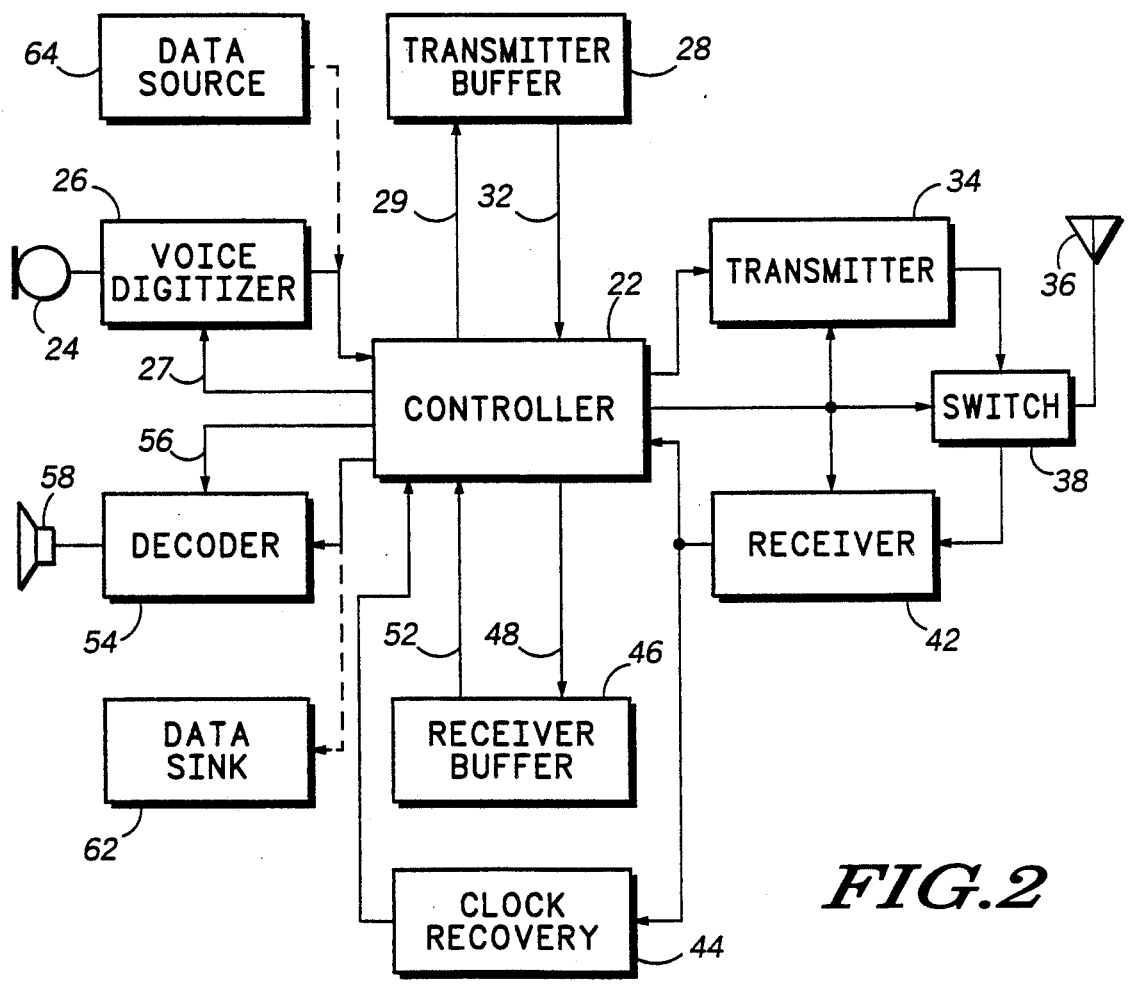
FIG. 2 is a block diagram of either radio of FIG. 1.

FIG. 2 illustrates a block diagram of the radio 12 (or 14) having a controller 22 to oversee total radio operation. Operationally, audio energy impressed upon a microphone 24 is digitized continuously at normal speed (speech information rate) by a voice digitizer 26, which is enabled by the controller 22 via a connection 27. The voice digitizer is activated by a voice operated relay (VOX) location within the voice digitizer 26. When voice is present, the voice digitizer 26 encodes according to a vocoding scheme such as LPC, sub-band coding (SBC) or another scheme. The controller 22 feeds the digitized voice signal into a tranmsitter buffer 28 via a data line 29. To achieve time compression suitable to properly TDM the physical or logical communication channel, information is retrieved from the transmitter buffer 28 by the controller 22 (via a connection 32) at a selected rate exceeding that at which it was stored (channel transmission rate or channel bit rate). To provide a digitized voice tranmsit burst, the retrieved information is routed to a transmitter 34. Additionally, the controller 22 attaches a preamble which constitutes a predetermined control signal to the speech information.

The duration and timing of the slots are defined according to the invention and may be changed under command of the control station 13 during peak conditions as described later for TDMA or other applicable systems. Redefining the slots permits the more dominant speaker to be accorded the longer slot length, while the listener is provided with a shorter slot for acknowledgements. Reversal occurs whenever the listener speaks longer than a predefined brief acknowledgement.

The controller 22 couples the transmitter 34 to an antenna 36 via a switch 38. Alternatively, the switch 38 could be replaced with a duplexer (or the like) to continually couple the transmitter and receiver to the antenna. Data information (already in digital form) may be transmitted in the same manner via data source 64.

To receive information from the physical or logical channel, the controller 22 couples the antenna 36 to a receiver 42 via the switch 38. The receiver 42 is coupled both to the controller 22, and a clock recovery means 44, which may be any suitable means that will synchronize the controller 22 to the received information using the control signals. Once synchronized, the controller 22 couples the received digitized voice signal into a receiver buffer 46 via a connection 48 at the higher rate (transmission rate) during one or more receive slots (transmission rate). The contents of the buffer 46 are applied continuously via a decoder 54 (via a connection 52) to the controller 22 operating at normal speed (speech information rate). The decoder is enabled by the controller 22 via a connection 56 and includes means to detect the presence or absence of voice. To generate speaker audio, the analog information is routed to a speaker 58. If, however, data was transmitted during a TDM slot, a data sink 62, which may be a printer or monitor device, accepts the data and displays it for the operator.

Figure 3:
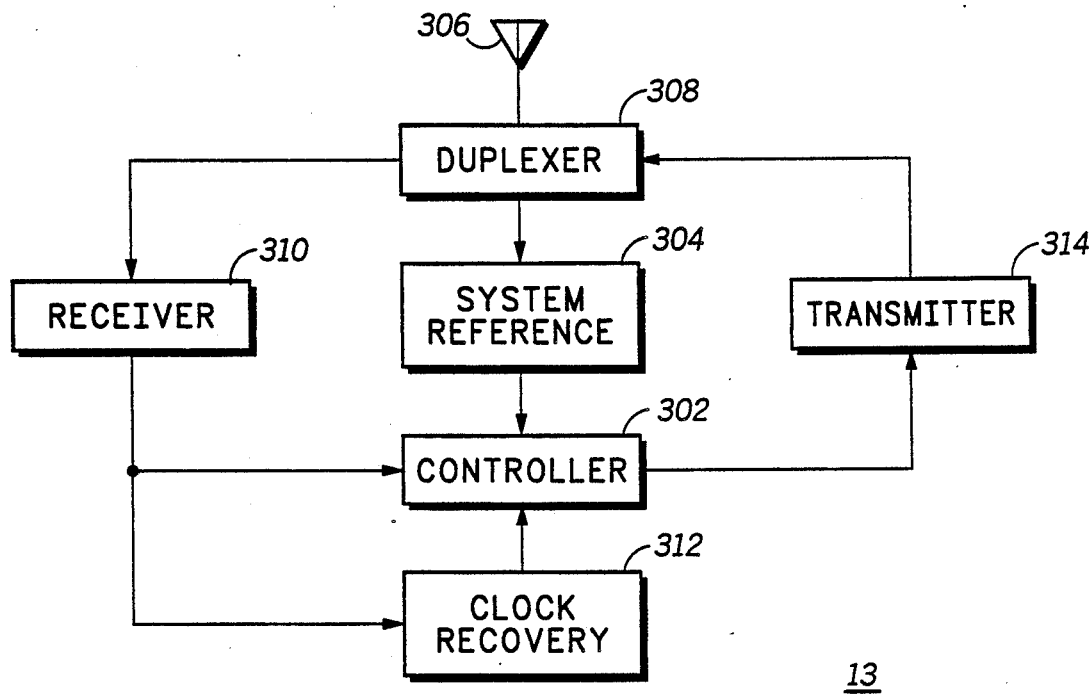
FIG. 3 is a block diagram of the control station of FIG. 1.

Referring to FIG. 3, the control station 13 (or repeater) of FIG. 1 suitable for use in the TDM system of the present invention is shown. The control station 13 is controlled by a controller 302, which takes a master clock signal from a system reference 304. Operationally, a vo-coded signal is received from at least one time slot on a first physical or logical channel via an antenna 306 and routed via a duplexer 308 to a receiver 310. The receiver 310 supplies signals to the clock recovery means 312 and the controller 302. The controller 302 accepts the received data signal from the receiver 310 at the data rate determined by the clock recovery means 312 and supplies it to the transmitter 314. The transmitter 314 repeats the signal including the overhead in at least one time slot on a second physical or logical channel (at a transmission data rate determined by the controller 302) through the duplexer to the antenna. Those skilled in the art will appreciate that either the multiple frequency repeater as illustrated or a single frequency repeater (SFR) may be used alternately or in combination in any particular TDM system. Accordingly, in the SFR, the transmitter 314 and receiver 310 are multiplexed to the antenna 306 and the duplexer is not required.

Figure 4:
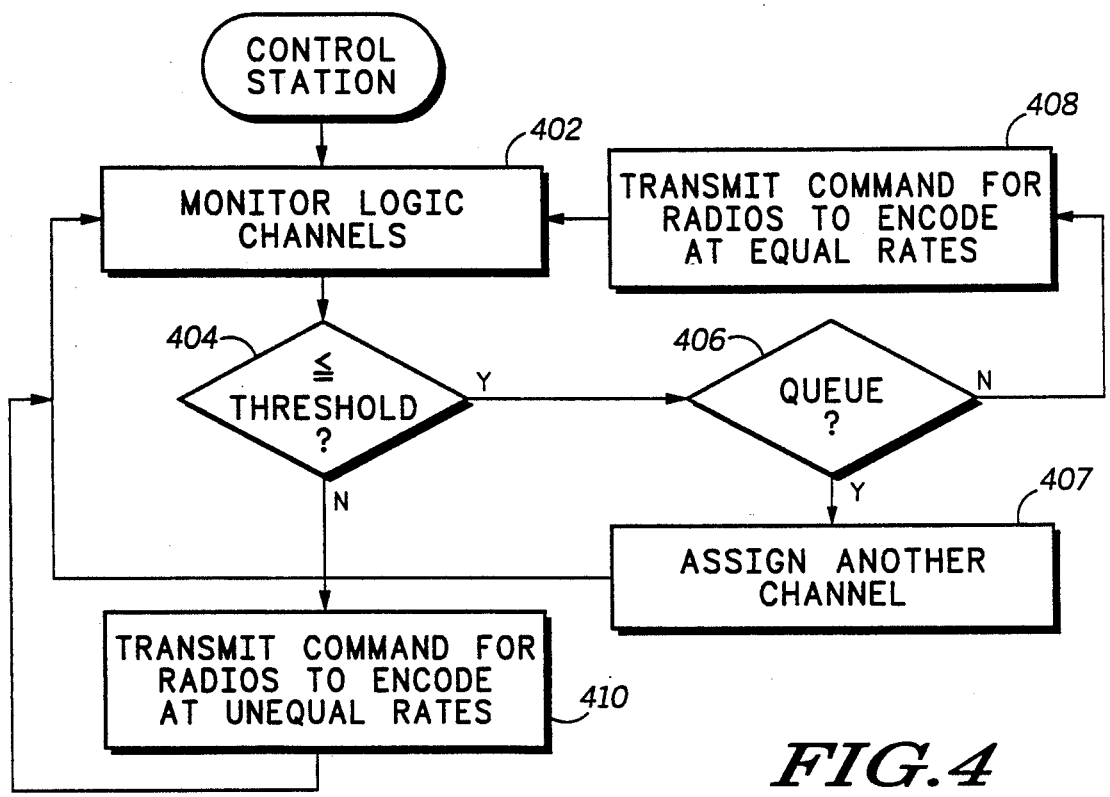
FIG. 4 is a flow diagram of the steps executed by the controller of FIG. 3. for changing from equal to unequal bit rates in a TDMA application.

Referring to FIG. 4, the steps executed by the control station 13 are illustrated for changing from equal to unequal bit rates in a TDMA application. The routine begins in step 402, which monitors the usage of a plurality of logical channels. With this system loading information, decision 404 determines whether the total number of logical channels in use is less than or equal to a predefined threshold. Usually, the threshold is the number of logical channels available when the speech of the talker and listener are encoded at equal rates. If the total number of logical channels in use is less than or equal to the number of total logical channels available, decision 406 checks the status of the users waiting in queue. Assuming the queue is empty, the control station 13 transmits command for the radios of the talker and listener to encode at equal rates in step 408. However, if users are waiting step 407 assigns another logical channel to each user in queue before returning to the monitoring step of 402. But if the total number of logical channels in use is greater than the threshold number, the control station 13 transmits a different command for the radios of the talker and listener to encode at unequal rates in step 410. To continue monitoring the logical channels, the routine returns to step 402.

Referring to FIG. 5a, a communication logical channel is illustrated having a bandwidth sufficient to allow two encoded voice signals to be transmitted within slots 72 and 74 of a frame 66. Areas between the slots 76, 78, 82, are reserved for functions other than voice transmission or reception. Some are gaps to allow for the proper operation of the switch 38, and for the transmitter and receiver to stabilize and synchronize. In addition, for a TDMA application for example, some of the areas are filled as slots with data and channel control bits inserted by the control station 13 to command the radios to switch slot allocations depending on the physical system channel capacity.

The talker radio 12 transmits to the listening radio 14 in a slot 72 having a first duration to accommodate information encoded at a first rate. In a slot 74 having the same first duration to accommodate information encoded at the same rate, radio 12 detects an information signal from the radio 14. This provides equal audio quality for both radios. In accordance with the invention for a TDMA application, equal audio quality is provided during off-peak operational hours, when not all the logical channels are in use or the queues are not too long. As is known, the control station 13 determines how many logical channels are in used as compared against a normal capacity threshold. The radios continue transmission at equal coding rates until commanded by the control station 13 to change.

When all the present logical channels are used, the sequence of operations follows FIG. 5b. In accordance with the invention, two voice signals coded at unequal rates are transmitted more efficiently within a smaller frame 86. The voice signal in the return slot 92 is encoded at a slower rate resulting in a smaller slot 92. As a result, more logical channels can be accommodated on a TDMA system.

Upon command of the control station 13, the controller 22 of the listener unit varies the voice digitizer 26 to reduce the coding rate in and the duration of the return slot. Meanwhile, the controller 22 of the talker unit maintains the voice digitizer 26 at the higher encoding rate to keep the longer slot duration for the forward voice signal. Since the return voice signal normally contains only brief feedback messages, the decrease in audio quality does not significantly impact the conversation. Hence, the invention balances spectral efficiency against voice quality. Under the direction of the controller 22, the radio 12 transmits to the radio 14 in a slot 88 having the first duration to accommodate information encoded at the first rate. Meanwhile, radio 12 detects transmission from radio 14 in a slot 92 having a reduced duration to accommodate information encoded at the reduced second rate.

If the listening radio 14 transmits a voice transmission longer than a predefined period (indicating a desire to talk instead of just acknowledge) in slot 94, the radio 12 will detect the increased transmission from radio 14, and upon detecting an absence of transmission from its operator, the radios exchange slot allocations. Using the smaller slot 96, the radio 12 acknowledges the slot exchange. On the other end, the radio 14 transmits information in a slot 98 having the longer duration to accommodate information encoded at the higher rate. Basically, whoever is the dominant talker will have the longer slot by encoding at the higher rate. The unequal slot allocation will continue until the physical channel is no longer operating at peak capacity as determined by the control station 13.

We claim as our invention:

1. A method for communication between at least a first unit and a second unit via a time division multiplexed communciation channel, comprising the steps of:
   (a) transmitting an information signal from said first unit to at least said second unit in a first slot encoded at a first rate allocated to said first unit, said first slot having a first duration;
   (b) detecting by said first unit an information signal from said second unit in a second slot encoded at a second rate allocated to said second unit, said second rate being slower than said first rate, and said second slot having a second duration smaller than said first duration;
   (c) exchanging slot rate allocation for converting said first slot to said second duration to accommodate information encoded at said second rate re-allocated to said first unit in response to detecting activity of said second unit;
   (d) exchanging slot rate allocation for adapting said second slot to said first duration to accommodate information encoded at said first rate re-allocated to said second unit; and
   (e) operating, thereafter, to receive an information signal from said second unit in said second slot encoded at said first rate re-allocated to said second unit.

2. The method of claim 1, wherein step (b) comprises:
   (b1) detecting a voice signal from said second unit;
   (b2) detecting silence of said first unit.

3. The method of claim 1, wherein said step (b) comprises:
   (b1) detecting an information signal over a predefined period of time from said second unit; and
   (b2) detecting silence of said first unit.

4. The method of claim 1, wherein said detecting step comprises receiving a command.

5. The method of claim 1, wherein said detecting step comprises detecting a voice signal.

6. The method of claim 1, wherein said detecting step comprises detecting a data information signal.

7. The method of claim 1, wherein said detecting step comprises detecting a control signal.

8. A method for communication between at least a first unit and a second unit via a time division multiplexed communication channel, comprising the steps of:
   transmitting an information signal from said first unit to at least said second unit in a first slot encoded at a first rate allocated to said first unit, said first slot having a first duration;
   decoding information by said first unit from said second unit in a second slot encoded at a second rate allocated to said second unit, said second rate being slower than said first rate, and said second slot having a second duration smaller than said first duration;
   exchanging slot rate allocation for converting said first slot to said second duration to accommodate information encoded at said second rate re-allocated to said first unit in response to decoding information from said second unit;
   exchanging slot rate allocation for adapting said second slot to said first duration to accommodate information encoded at said first rate re-allocated to said second unit; and
   thereafter, receiving an information signal from said second unit in said second slot encoded at said first rate re-allocated to said second unit until transmission of activity from said first unit in said first slot encoded at said second rate is received.

9. The method of claim 8, wherein said decoding step comprises monitoring said second slot to determine whether said second unit has transmitted.

10. A method for communication between at least a first unit and a second unit via a time division multiplexed communication channel, comprising the steps of:

in at least said first unit:
- (a) encoding an information signal at a first rate allocated to said first unit;
- (b) transmitting said information signal in a first slot having a first duration;
- (c) monitoring a second slot encoded at a second rate allocated to said second unit, said second rate being slower than said first rate, and said second slot having a second duration being shorter than said first duration;
- (d) exchanging slot rate allocation for converting said first to said second duration to accommodate information encoded at said second rate re-allocated to said first unit in response to step (c);
- (e) adapting said second slot to said first duration to accommodate information encoded at said first rate re-allocated to said second unit; and
- (f) operating, thereafter, to receive an information signal from said second unit in said second slot encoded at said first rate re-allocated to said second unit.

11. The method of claim 10, wherein said encoding step comprises encripting an information signal.

12. The method of claim 10, wherein said encoding step comprises vocoding an information signal.

13. A method for communication between at least a first unit and a second unit via a control station on a time division multiple access communication channel partitioned into a plurality of logical channels each selectively having variable encoding rates and slot durations, comprising the steps of:

at said first unit:
 transmitting information signals from said first unit to at least said control station in a first slot encoded at a first rate, said first slot having a first duration;
 receiving in a second slot information signals encoded at said first rate, said second slot having said first duration;
 adapting in response to a command signal to adapt said first slot to have a third duration being at most equal to said first duration to accommodate information encoded at a third rate being at most equal to said first rate, while adapting said second slot to have a fourth duration smaller than said third duration to accommodate information encoded at a fourth rate being slower than said third rate;
 transmitting information signals to at least said control station in said first slot encoded at said third rate, said first slot having said third duration;
 detecting information signals from said control station in said second slot encoded at said fourth rate, said fourth rate being slower than said third rate, and said second slot having said fourth duration smaller than said third duration;
 converting said first slot to said fourth duration to accommodate information encoded at said fourth rate in response to detecting activity of said control station;
 adapting said second slot to said third duration to accommodate information encoded at said third rate; and
 operating, thereafter, to receive information signals from said control station in said second slot encoded at said third rate, and
 receiving information signals from said first unit;
 repeating information signals to at least said second unit;
 receiving information signals from said second unit;
 repeating information signals to at least said first unit;
 determining a value representing a total quantity of a plurality of logical channels in use; and
 comparing said value to a threshold representing a predetermined number of said plurality of logical channels and transmitting said command signal when said value is at least equal to said threshold.

14. The method of claim 13, wherein said comparing step comprises comparing said value to a threshold representing a total quantity of said plurality of logical channels presently available having equal slot durations and coding rates.

15. A method for communication between at least a first unit and a second unit via a control station on a time division multiple access communication channel selectively having variable encoding rates and slot durations, comprising the steps of:

at said first unit:
 transmitting an information signal to at least said control station in a first slot encoded at a first rate, said first slot having a first duration;
 receiving in a second slot an information signal encoded at said first rate, said second slot having said first duration;
 adapting in response to a command signal to provide said first slot having a third duration being at most equal to said first duration to accommodate information encoded at a third rate being at most equal to said first rate, while providing said second slot to have a fourth duration smaller than said third duration to accommodate information encoded at a fourth rate being slower than said third rate; and
 transmitting an information signal to at least said control station in said first slot encoded at said third rate, said first slot having said third duration, and at said control station:
 receiving said information signal from said first unit;
 repeating said information signal to at least said second unit;
 receiving said information signal from said second unit;
 repeating said information signal to at least said first unit;
 determining a value representing a total quantity of information carried over said channel; and
 comparing said value to a threshold representing a normal quantity of information and transmitting said command signal when said value is at least equal to said threshold.

16. The method of claim 15, wherein said adapting step comprises providing said second slot to have a fourth duration smaller than said third duration to accommodate information encoded at a fourth rate being slower than said third rate, irregardless of audio quality.

17. In a TDM communication system operating between at least a first unit and a second unit via a time division multiplexed communication channel, a device capable of communicating within said system, comprising:
 means for transmitting an information signal from said first unit to at least said second unit in a first slot encoded at a first rate allocated to a first unit, said first slot having a first duration;
 means for detecting activity of said second unit in a second slot encoded at a second rate allocated to a second unit, said second rate being slower than said first rate, and said second slot having a second duration smaller than said first duration;

means responsive to means for detecting activity of said second unit for exchanging slot rate allocation by converting said first slot to said second duration to accommodate information encoded at said second rate re-allocated to said first unit while adapting said second slot to said first duration to accommodate information encoded at said first rate re-allocated to said second unit; and means to receive an information signal from said second unit in said second slot encoded at said first rate re-allocated to said second unit.

18. The device of claim 17, wherein said transmitting means comprises means for digitally analyzing a voice signal encoded at said first rate to provide said information signal in said first slot.

19. The device of claim 18, wherein said means for detecting comprises means for decoding at said second rate to recover said voice signal from said activity received in said second slot.

20. A method for communication between at least a first unit and a second unit via a time division multiplexed communication channel, comprising the steps of:
at a first unit:
 (a) transmitting an information signal from said first unit to at least said second unit in a first slot encoded at a first rate, said first slot having a first duration;
 (b) detecting activity of said second unit in a second slot encoded at a second rate, said second rate being slower than said first rate, and said second slot having a duration smaller than said first duration;
 (c) converting said first slot to said second duration to accommodate information encoded at said second rate in response to detecting activity of said second unit;
 (d) adapting said second slot to said first duration to accommodate information encoded at said first rate; and
 (e) operating, thereafter, to receive an information signal from said second unit in said second slot encoded at said first rate, and
at a second unit:
 (a) receiving said information signal in said first slot encoded at said first rate, said first slot having said first duration;
 (b) transmitting a signal representing activity in a second slot encoded at said second rate, said second rate being slower than said first rate, and said second slot having said second duration smaller than said first duration;
 (c) converting said first slot to said second duration to accommodate information received at said second rate in response to step (b);
 (d) adapting said second slot to said first duration to accommodate information encoded at said first rate; and
 (e) operating, thereafter, to transmit said information signal in said second slot encoded at said first rate.

* * * * *